(12) United States Patent
Cauvin et al.

(10) Patent No.: US 10,127,640 B2
(45) Date of Patent: Nov. 13, 2018

(54) METHOD AND DEVICE FOR REDUCING NOISE IN A COMPONENT OF A PICTURE

(71) Applicant: THOMSON LICENSING, Issy les Moulineaux (FR)

(72) Inventors: Laurent Cauvin, Chevaigne (FR); Tania Pouli, Le Rheu (FR); Guillaume Poirier, Rennes (FR)

(73) Assignee: INTERDIGITAL VC HOLDINGS, Wilmington, DE (US)

( * ) Notice: Subject to any disclaimer, the term of this patent is extended or adjusted under 35 U.S.C. 154(b) by 98 days.

(21) Appl. No.: 15/424,840

(22) Filed: Feb. 4, 2017

(65) Prior Publication Data
US 2017/0228854 A1    Aug. 10, 2017

(30) Foreign Application Priority Data
Feb. 4, 2016  (EP) .................................... 16305120

(51) Int. Cl.
*G06T 5/00*    (2006.01)
*G06T 5/20*    (2006.01)

(52) U.S. Cl.
CPC ............... *G06T 5/002* (2013.01); *G06T 5/20* (2013.01); *G06T 2207/20024* (2013.01); *G06T 2207/20204* (2013.01)

(58) Field of Classification Search
None
See application file for complete search history.

(56) References Cited

U.S. PATENT DOCUMENTS 4,827,342 A    5/1989  Ohta et al.
5,173,769 A *  12/1992 Hashimoto ............... G06T 5/20
                                                         358/520
(Continued)

FOREIGN PATENT DOCUMENTS

JP    4946795    6/2012

OTHER PUBLICATIONS

Pouli et al., "Scene Adaptative Inverse Tone Mapping for LDR to HDR conversion", European Paten Application, Dec. 27, 2013, pp. 1-9.
Colaitis et al., "Optimized Content-Adaptive Inverse Tone Mapping for LDR to HDR Conversion", European Patent Application, May 7, 2015, pp. 1-21.
(Continued)

*Primary Examiner* — Kim Vu
*Assistant Examiner* — Nathan Bloom
(74) *Attorney, Agent, or Firm* — Brian J. Dorini; Patricia A. Verlangieri

(57) ABSTRACT

The present principles relate to a method and a device for reducing noise in a component of a picture. The method includes obtaining a low-pass filtered component by low-pass filtering the component of the picture, for a current pixel in the component of the picture. For at least one current neighboring pixel of the current pixel, computing a distance, relative to the current neighboring pixel, between the value of the current pixel in the low-pass filtered component and the value of the current neighboring pixel in the low-pass filtered component. When the distances relative to the at least one neighboring pixels of the current pixel are lower than a first threshold, modifying the value of the current pixel in said component of the picture according to a linear combination of the value of the current pixel in the component of the picture and the value of the current pixel in the low-pass filtered component. Otherwise the value of the current pixel in the at least one component of the picture remains unchanged.

10 Claims, 6 Drawing Sheets

(56) References Cited

U.S. PATENT DOCUMENTS

| | | | | |
|---|---|---|---|---|
| 6,222,881 | B1* | 4/2001 | Walker | H04N 19/176 |
| | | | | 375/240.02 |
| 6,778,692 | B1 | 8/2004 | Yazici | |
| 7,437,013 | B2 | 10/2008 | Anderson | |
| 8,553,111 | B2 | 10/2013 | Tsuruoka | |
| 2005/0094003 | A1 | 5/2005 | Thorell | |
| 2008/0292209 | A1* | 11/2008 | Vakrat | G06T 5/009 |
| | | | | 382/275 |
| 2009/0033773 | A1* | 2/2009 | Kinoshita | G06T 3/4023 |
| | | | | 348/241 |
| 2010/0054622 | A1 | 3/2010 | Adams | |
| 2010/0259650 | A1* | 10/2010 | Sasaki | G06K 9/6212 |
| | | | | 348/241 |
| 2011/0007973 | A1* | 1/2011 | Kwon | G06K 9/48 |
| | | | | 382/199 |
| 2015/0358560 | A1 | 12/2015 | Boulanger et al. | |
| 2018/0084230 | A1* | 3/2018 | Yachi | H04N 9/04 |

OTHER PUBLICATIONS

Ng et al., "A Switching Median Filter With Boundary Discriminative Noise Detection for Extremely Corrupted Images", IEEE Transactions on Image Processing, vol. 15, No. 6, Jun. 2006, pp. 1506-1516.

Wang et al., "Noise Adaptive Rational Filter", Signal, Image and Video Processing, vol. 4, No. 1, Mar. 2010, Abstract and pp. 40.

Zhang et al., "Joint Denoising and Demosaicking of Noisy CFA Images Based on Inter-Color Correlation", 2014 IEEE International Conference on Acoustics, Speech and Signal Processing (ICASSP), Florence, Italy, May 4, 2014, pp. 5784-5788.

* cited by examiner

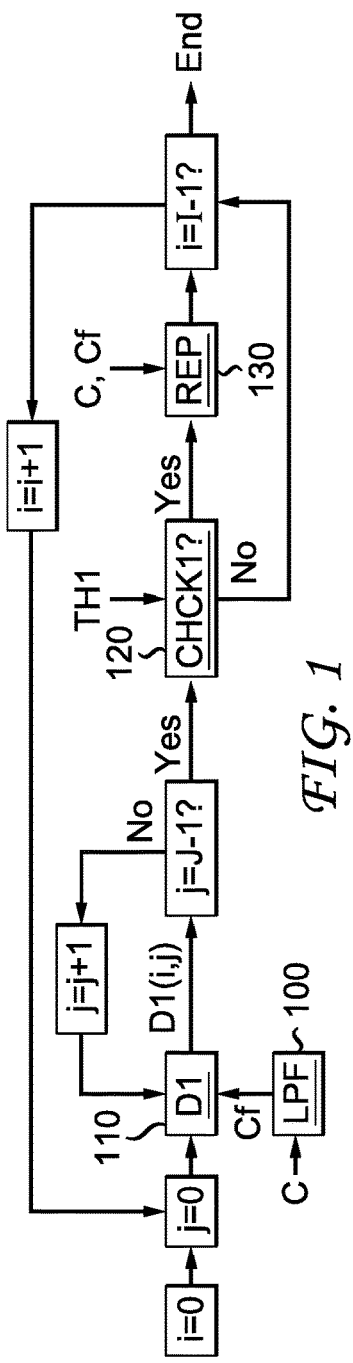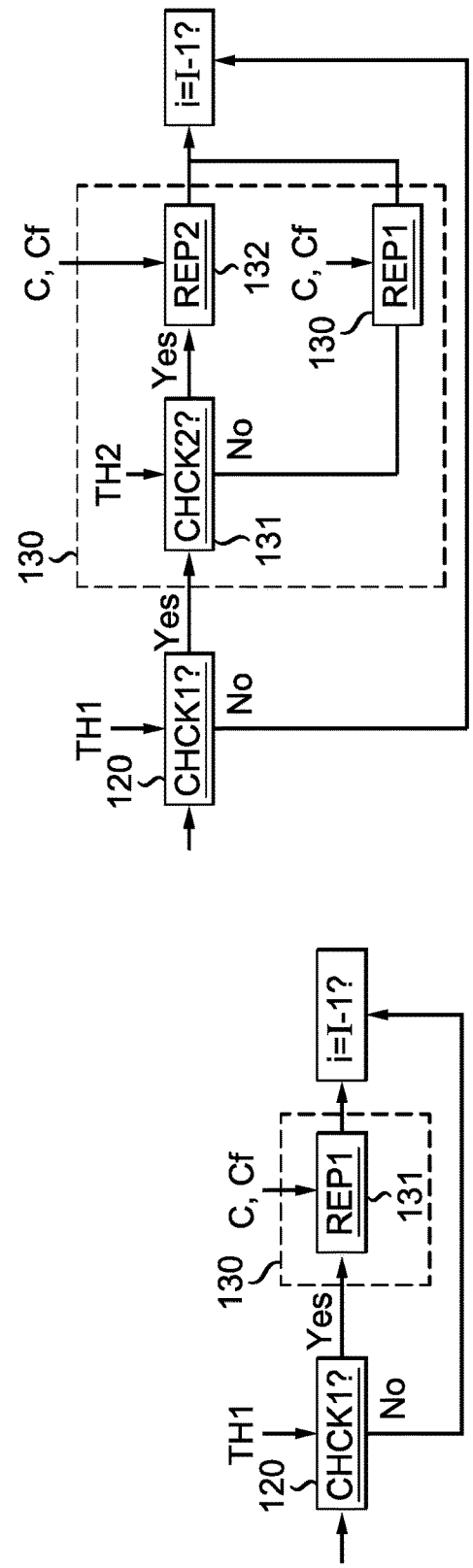
FIG. 1
FIG. 2
FIG. 3

METHOD AND DEVICE FOR REDUCING NOISE IN A COMPONENT OF A PICTURE

1. REFERENCE TO RELATED EUROPEAN APPLICATION

This application claims priority from European No. 16305120.4, entitled "METHOD AND DEVICE FOR REDUCING NOISE IN A COMPONENT OF A PICTURE", filed on Feb. 4, 2016, the contents of which are hereby incorporated by reference in its entirety.

2. FIELD OF THE INVENTION

The present principles generally relate to noise reduction in a picture/video. Particularly, but not exclusively, the present principles may be applied to an inverse-tone-mapping embedding the reducing of noise of a picture.

3. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Images taken with both digital cameras and conventional film cameras will pick up noise from a variety of sources. Further use of these pictures will often require that the noise be (partially) removed—for aesthetic purposes as in artistic work or marketing, or for practical purposes such as computer vision.

In salt and pepper noise (sparse light and dark disturbances), pixels in the picture are very different in color or intensity from their surrounding pixels; the defining characteristic is that the value of a noisy pixel bears no relation to the color of surrounding pixels. Generally this type of noise will only affect a small number of image pixels. When viewed, the image contains dark and white dots, hence the term salt and pepper noise. Typical sources include flecks of dust inside the camera and overheated or faulty CCD elements In Gaussian noise, each pixel in the picture will be changed from its original value by a (usually) small amount. A histogram, a plot of the amount of distortion of a pixel value against the frequency with which it occurs, shows a normal distribution of noise. While other distributions are possible, the Gaussian (normal) distribution is usually a good model, due to the central limit theorem that says that the sum of different noises tends to approach a Gaussian distribution.

In either case, the noise at different pixels can be either correlated or uncorrelated; in many cases, noise values at different pixels are modeled as being independent and identically distributed, and hence uncorrelated.

Reducing noise in a picture requires selecting a noise reduction method.

In selecting a noise reduction algorithm, one would usually weigh several factors:

the available computer power and time available: a digital camera must apply noise reduction in a fraction of a second using a tiny onboard CPU, while a desktop computer has much more power and time and whether sacrificing some real detail is acceptable if it allows more noise to be removed (how aggressively to decide whether variations in the image are noise or not).

The noise reduction method in accordance with the present principles aims to reduce the visibility of noise and grain without overly smoothing picture details and edges.

4. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for reducing noise in a component of a picture. The method comprises:

obtaining a low-pass filtered component by low-pass filtering said component of the picture;

for a current pixel in said component of the picture:

for at least one current neighboring pixel of the current pixel, computing a distance, relative to the current neighboring pixel, between the value of the current pixel in the low-pass filtered component and the value of the current neighboring pixel in the low-pass filtered component;

when the distances relative to said at least one neighboring pixels of the current pixel are lower than a first threshold, modifying the value of the current pixel in said component of the picture according to a linear combination of the value of the current pixel in said component of the picture and the value of the current pixel in the low-pass filtered component, otherwise the value of the current pixel in said at least one component of the picture remains unchanged.

According to an embodiment, the modifying of the value of the current pixel in said component of the picture comprises replacing the value of the current pixel in said component of the picture by said linear combination.

According to an embodiment, the modifying of the value of the current pixel in said component of the picture comprises:

if at least one of the distance relative to a neighboring pixel is greater than a second threshold, said second threshold being lower than said first threshold, replacing the value of the current pixel in said component of the picture by said linear combination weighted by a coefficient that depends on both the value of the current pixel in said component, the value of the current pixel in the low-pass filtered component and the first and second thresholds;

otherwise replacing the value of the current pixel in said component of the picture by said linear combination.

According to an embodiment, the method further comprises:

computing a distance, relative to the current pixel, between the value of the current pixel in said component of the picture and the value of the current pixel in the low-pass filtered component; and when said distance, relative to the current pixel, is higher than a third threshold:

checking if said distances are lower than the first threshold; and when said distances are lower than the first threshold, modifying the value of the current pixel in said component of the picture according to said linear combination, otherwise the value of the current pixel in said at least one component of the picture remains unchanged.

According to an embodiment, said linear combination is defined by the value of the current pixel in said component of the picture and a difference between the value of the current pixel in said component of the picture and the value of the current pixel in the low-pass filtered component.

According to an embodiment, said linear combination is defined by a difference between the value of the current pixel in said component of the picture and a product of the difference between the value of the current pixel in said component of the picture and the value of the current pixel in the low-pass filtered component by an attenuation function of the value of the current pixel in said component of the picture.

According to an embodiment, said attenuation function of the value of the current pixel in said component of the picture is a piecewise-linear function.

According to an embodiment, the values of said attenuation function are obtained from a look-up table.

According to another of their aspects, the present principles relate to a device for reducing noise in a component of a picture, characterized in that the device comprises a processor configured to:
  obtain a low-pass filtered component by low-pass filtering said component of the picture;
  for a current pixel in said component of the picture:
    for at least one current neighboring pixel of the current pixel, compute a distance, relative to the current neighboring pixel, between the value of the current pixel in the low-pass filtered component and the value of the current neighboring pixel in the low-pass filtered component;
    when the distances relative to said at least one neighboring pixels of the current pixel are lower than a first threshold, modify the value of the current pixel in said component of the picture according to a linear combination of the value of the current pixel in said component of the picture and the value of the current pixel in the low-pass filtered component,
    otherwise the value of the current pixel in said at least one component of the picture remains unchanged.

According to another of their aspects, the present principles relate to a method for inverse-tone mapping a component of a picture, characterized in that the method comprises:
  obtaining a digital image;
  determining luminance values of pixels of the digital image;
  determining one or more values of luminance zone boundaries;
  determining a zone expansion exponent map based on the luminance values and the one or more luminance zone boundaries that divide the zone expansion exponent map into a plurality of luminance zones;
  denoising the luminance values of pixels of the digital image;
  inverse tone mapping the denoised luminance values based on the zone expansion exponent map; and
  providing an expanded dynamic range image based on the inverse tone mapped luminance values.

According to another of their aspects, the present principles relate to a device for inverse-tone mapping a component of a picture, characterized in that it comprises a processor configured to:
  obtain a digital image;
  determine luminance values of pixels of the digital image;
  determine one or more values of luminance zone boundaries;
  determine a zone expansion exponent map based on the luminance values and the one or more luminance zone boundaries that divide the zone expansion exponent map into a plurality of luminance zones;
  denoise the luminance values of pixels of the digital image;
  inverse tone map the denoised luminance values based on the zone expansion exponent map; and
  provide an expanded dynamic range image based on the inverse tone mapped luminance values.

According to other of their aspects, the present principles relate to a device comprising a processor configured to implement the above method, a computer program product comprising program code instructions to execute the steps of the above method when this program is executed on a computer, a non-transitory storage medium carrying instructions of program code for executing steps of the above method when said program is executed on a computing device.

The specific nature of the present principles as well as other objects, advantages, features and uses of the present principles will become evident from the following description of examples taken in conjunction with the accompanying drawings.

5. BRIEF DESCRIPTION OF DRAWINGS

In the drawings, examples of the present principles are illustrated:

FIG. 1 shows a diagram of the steps of the method for reducing noise in a component of a picture in accordance with an example of the present principles;

FIG. 2 shows a diagram of the steps of an embodiment of the step 130 of the method of FIG. 1 in accordance with an example of the present principles;

FIG. 3 shows a diagram of the steps of an embodiment of the step 130 of the method of FIG. 1 in accordance with an example of the present principles;

Similar or same elements are referenced with the same reference numbers.

6. DESCRIPTION OF EXAMPLE OF THE PRESENT PRINCIPLES

Figure 4:
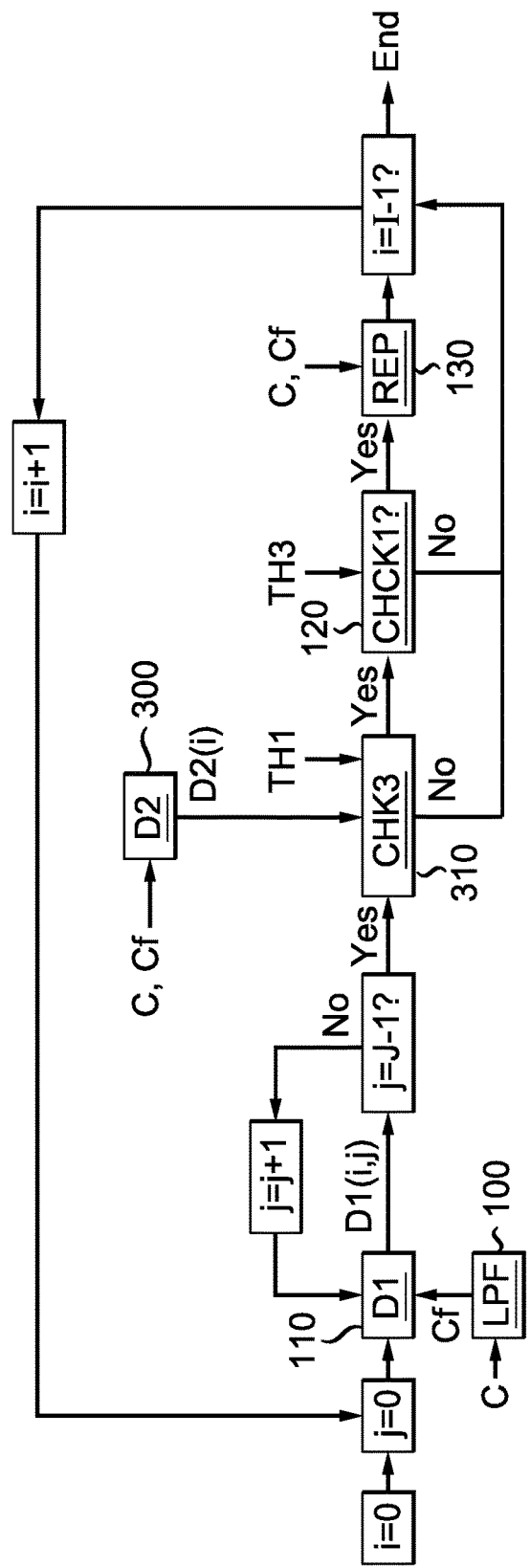
FIG. 4 shows a diagram of the steps of a variant of the embodiments of the method for reducing noise in a component of a picture in accordance with an example of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for reducing noise in a component of a picture and can be applied to reduce noise in at least one component of a picture comprising more than one component and can be applied to at least one component of at least one picture of a sequence of pictures (video) because noise of each component of each picture of the sequence is sequentially reduced as described below. The present principles are described for inverse-tone mapping a picture but can be applied to expand the dynamic range of each picture in a sequence of more than one picture.

The present principles are described for a current pixel in a component of a picture but extends to several pixels of a picture because each current pixel is considered independently one to each other. Preferably, all the pixels of the component of a picture are considered.

In the following, a picture contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of COMP values, where COMP is the number of components C. Each value of a vector is represented with a number of bits which defines a maximal dynamic range of the pixel values.

In the following, the term "a pixel in a component" refers to the spatial location (of the pixel) in a component, i.e. the index of an array when the samples of the component are stored in an array. For example, the spatial location may be defined by a row number and a column number that refers to an element of a 2D array of I elements (the component C comprises I pixels).

The term "a neighboring pixel of a current pixel in a component" refers to a pixel belonging to the same component and surrounding the current pixel. For example, a neighboring pixel j may be one of the 8 nearest spatial neighbors of a current pixel. In the following J neighboring pixels are considered for each current pixel i.

Preferably, the neighboring pixels (i−1) and (i+1) of a current pixel i are considered, i.e. the pixels located at a previous and next row or previous and next column of the component C. This reduces the complexity of the method and then limits hardware resources usage.

FIG. 1 shows a diagram of the steps of the method for reducing noise in a component of a picture in accordance with an example of the present principles.

In step 100, a module LPF obtains a low-pass filtered component Cf by low-pass filtering the component C of the picture.

For example, low-pass filtering a component of a picture may be computed by a separable 7×7 Gaussian filter with a sigma value equals to 2.

Then, for a current pixel i in the component C and for at least one current neighboring pixel j of the current pixel i, in step 110, a module D1 computes a distance D1(i,j), relative to the current neighboring pixel j, between the value $C_f(i)$ of the current pixel in the low-pass filtered component and the value $C_f(j)$ of the current neighboring pixel j in the low-pass filtered component:

$$D1(i,j)=f(C_f(i);C_f(j)) \forall j \in N_i$$

where $N_i$ is a set of J neighboring pixels of the current pixel i, and f(.) is a distance function that quantifies whether the two values are close one to each other.

For example, the distance function D1(i,j) is the absolute difference function or the Euclidean distance.

The distance D1(i,j) is usually computed for several pixels surrounding the current pixel.

Once the distance(s) D1(i,j) has (have) been computed for a current pixel i, in step 120, a module CHCK1 checks if this (those) distance(s) D1(i,j) $\forall j \in N_i$ is (are) lower than a first threshold TH1. When this condition is fulfilled, in step 130, a module REP modifies (130) the value C(i) of the current pixel in the component C according to a linear combination of the value C(i) and the value Cf(i) of the current pixel in the low-pass filtered component, otherwise the value C(i) remains unchanged.

Mathematically speaking, the condition is expressed as:

$$D1(i,j) \leq TH1 \text{ for all } j \in N_i \quad (1)$$

All the pixels i for which the condition of equation (1) is fulfilled form a specific zone in the picture called a "denoising" zone and all the pixels i for which the condition (1) is not fulfilled form a specific zone in the picture called a "no-denoising" zone.

FIG. 2 shows a diagram of the steps of an embodiment of the step 130 of the method of FIG. 1 in accordance with an example of the present principles.

According to this embodiment of the step 130, a module REP1 replaces (131) the value C(i) by a linear combination of the value C(i) and the value $C_f(i)$.

Preferably, the value C(i) is replaced by the linear combination of the value C(i) and the value $C_f(i)$ given by:

$$C_{den}(i)=C(i)-\alpha(C(i)) \cdot (C(i)-C_f(i)) \quad (2)$$

where $C_{den}(i)$ is the replaced value, $\alpha(.)$ is an attenuation function of the value C(i), $\alpha(.) \in [0; 1]$.

The method for reducing noise in a component of a picture as described above aims to reduce the visibility of noise and grain without overly smoothing picture details and edges. The key idea is that for a current pixel i we can choose between the value of the component C and a combination of the value of the component C and the value of the low-pass filtered component $C_f$ depending mainly on the neighboring content around the corresponding value of the current pixel in the low-pass filtered component $C_f$. By analyzing the values in the low-pass filtered component of several pixels surrounding the current pixel, we may then determine whether this pixel belongs to a smooth area or if it's near an edge. If the area is smooth, we may use a combination of the values of the components C and $C_f$ with no loss of detail. On the contrary, if there is an edge nearby, we will continue to use the value of the component C (the value of the current pixel remains unchanged).

FIG. 3 shows a diagram of the steps of an embodiment of the step 130 of the method of FIG. 1 in accordance with an example of the present principles.

According to this embodiment of step 130, a module CHCK2 checks if at least one of the distance D1(i,j) is greater than a second threshold TH2 (equation 3), said second threshold TH2 being lower than said first threshold TH1.

Mathematically speaking, the condition is expressed as:

$$D1(i,j) \geq TH2 \text{ for at least one } j \in N_i \quad (3)$$

When the condition of equation (3) is fulfilled, in step 132, a module REP2 replaces the value C(i) by a linear combination of the value C(i), the value Cf(i) and a coefficient B that depends on both the value C(i), the value Cf(i) and the first and second thresholds TH1 and TH2.

Preferably, the value C(i) is replaced by the linear combination of the value C(i) and the value $C_f(i)$ given by:

$$C_{den}(i) = C(i) - \alpha(C(i)) \cdot B(M) \cdot (C(i) - C_f(i)) \quad (4)$$

$$\text{where} = \frac{(TH1-M)}{(TH1-TH2)};$$

$$M = \max_j(|C_f(i) - C_f(j)|); \alpha(\cdot) \in [0; 1].$$

When the condition of equation (3) is not fulfilled (but the condition of equation (1) is fulfilled), the module REP1 replaces the value C(i) of the current pixel in the component C as explained above in relation with FIG. 2.

This embodiment of the step 130 allows a gradual reduction of the noise between the "no-denoising" and "denoising" zones.

Note that, when the condition of equation (1) is not fulfilled (120), the value of the current pixel in the component C remains unchanged as explained in relation with FIG. 1.

All the current pixels i for which the conditions of equations (1) and (3) are fulfilled form a specific zone in the picture called a transition zone.

FIG. 4 shows a diagram of the steps of an embodiment of the method for reducing noise in a component of a picture in accordance with an example of the present principles.

In step 300, a module D2 computes a distance $D_2(i)$, relative to the current pixel i, between the value C(i) and the value $C_f(i)$.

In step 310, a module CHK3 checks if the distance $D_2(i)$ is higher than a third threshold TH3.

Mathematically speaking, the condition is expressed as:

$$D_2(i)=f(C(i); C_f(i)) \geq TH3 \quad (5)$$

where f(.) is a distance function that quantifies whether the two values are close one to each other.

For example, the distance function $D2(i)$ is the absolute difference function or the Euclidean distance.

When the condition of equation (5) is fulfilled, the step 120 follows the step 310, i.e. the module CHCK1 checks (120) if this (those) distance(s) D1(i,j) $\forall j \in N_i$ is (are) lower than the first threshold TH1 and the value C(i) is replaced (130) or not as explained in relation with FIG. 1.

According to embodiments, the attenuation function $\alpha(.)$ may be a constant value ($\alpha(.) \in [0; 1].$).

According to an embodiment, the attenuation function $\alpha(.)$ is a piecewise linear curve or any other curve ($\alpha(.) \in [0; 1]$).

According to an embodiment, the values of the attenuation function are obtained from a look-up table ($\alpha(.) \in [0; 1]$).

Figure 5:
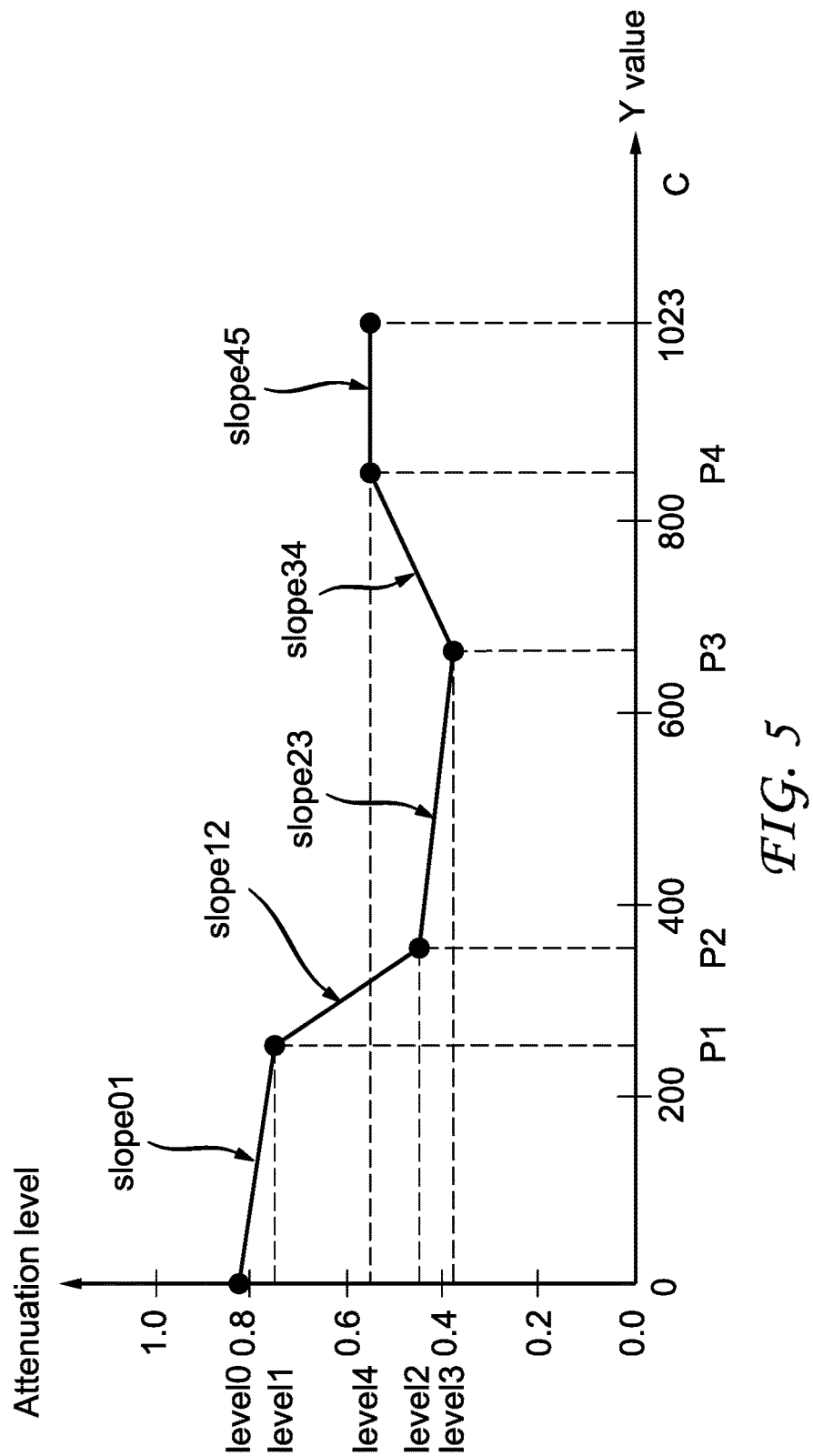
FIG. 5 shows an example of a piecewise linear curve used as an attenuation function $\alpha(.)$ in accordance with an example of the present principles.

FIG. 5 shows an example of a piecewise linear curve used as an attenuation function $\alpha(.)$ in accordance with an example of the present principles.

The attenuation levels are represented as floating point numbers in the [0 . . . 1] range on the ordinate axis and the values C(i) of the pixels in the component C are represented in the [0 . . . 1023] range on the abscise axis.

The piecewise linear curve comprises here five pieces but the number of pieces is not limited to 5.

If the value C(i) belongs to the [Pa . . . Pb[ range, the attenuation function is given by:

$$\alpha(C(i)) = \text{level}_a + \text{slope}_{ab} * (C(i) - P_a)$$

where $\text{slope}_{ab} = (\text{level}_b - \text{level}_a)/(P_b - P_a)$, $P_0 = 0$, $P_6 = 1023$ Note that such an attenuation function may be easily implemented in hardware using integer numbers.

Such an attenuation function may be adapted for applying different attenuation function according to brightness of a picture. For example, the shadows are defined by the [0. . . $P_1$] interval, the midrange by the [$P_2$. . . $P_3$] interval and the highlights by the [$P_4$. . . $P_5$] interval.

The method for reducing noise in a component of a picture as described in relation with the FIGS. 1-5 may be embedded in an inverse-tone mapping operator.

Reverse or inverse tone mapping operators (ITMO) may be employed to prepare conventional (low dynamic range) content for HDR (High Dynamic Range) display devices. Such methods process the luminance information of colored areas in the image content with the aim of recovering or recreating the appearance of the original scene. Typically, ITMOs take a conventional (LDR) image as input, expand the luminance range of the colored areas of the image in a global manner, and subsequently process highlights or bright regions locally to enhance the HDR appearance of colors in the image.

Figure 6A:
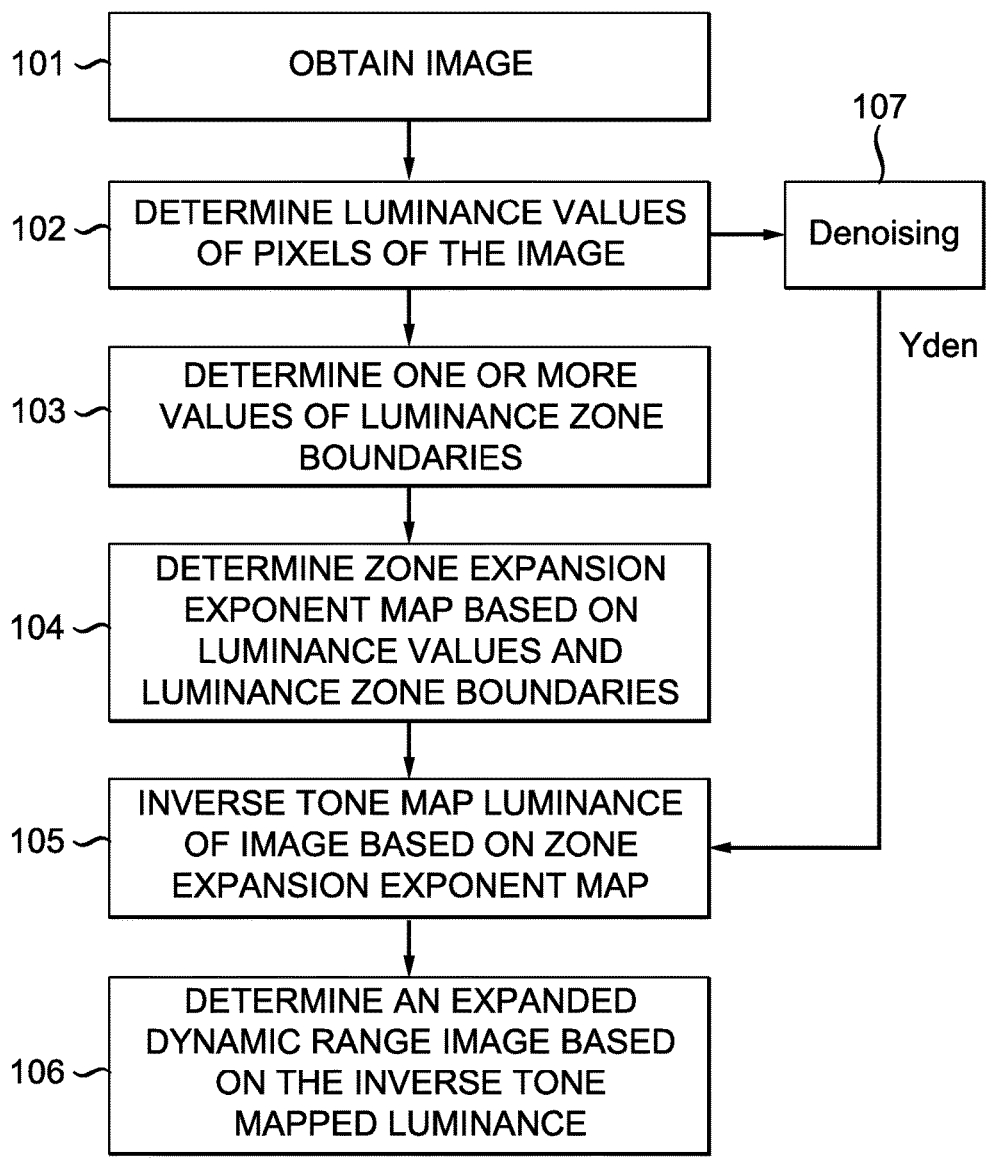
FIGS. 6a-6b show block diagrams illustrating examples of a method and a system for inverse tone mapping of an image based on multiple luminance zones according to various embodiments.
Figure 6B:
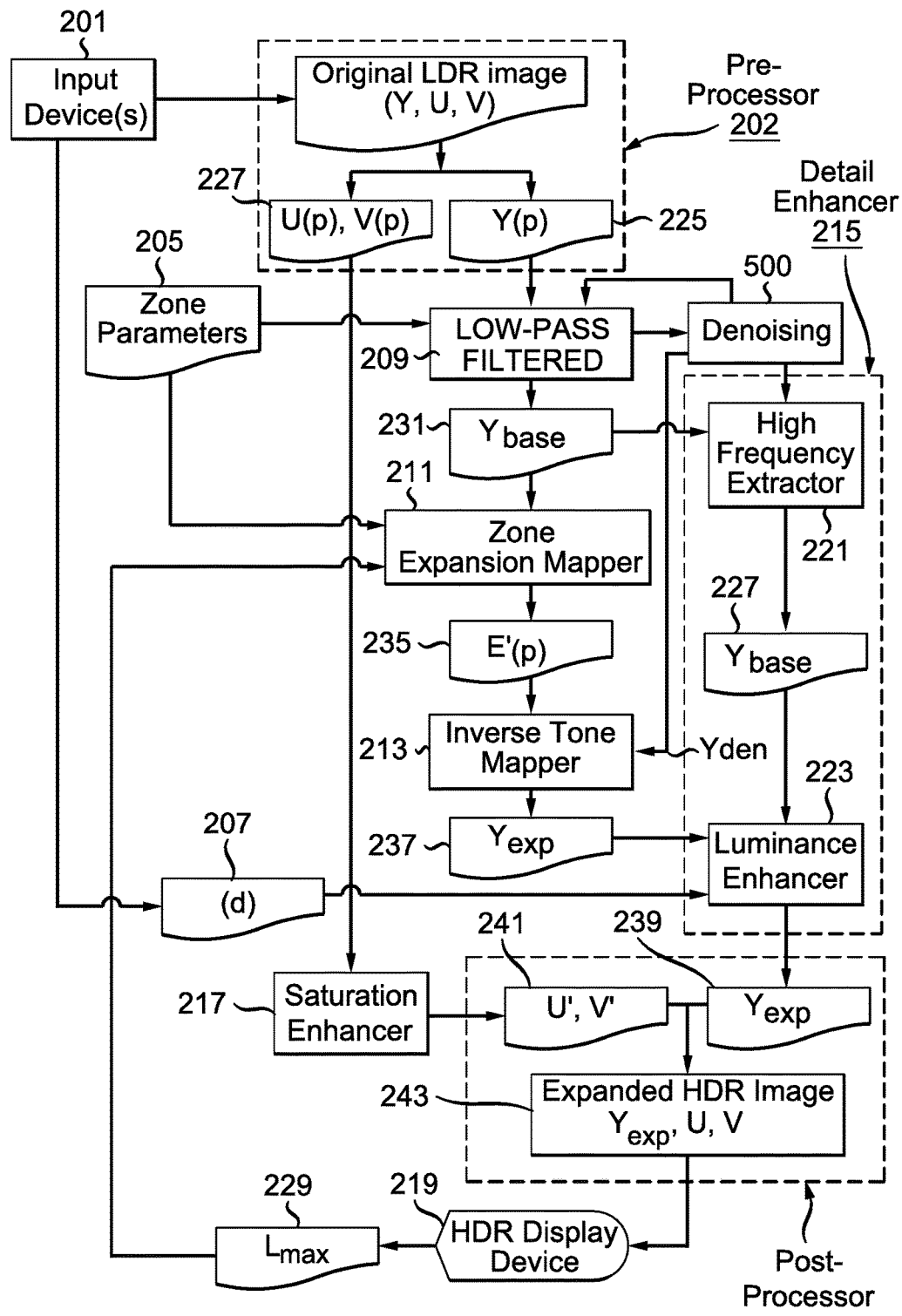

FIG. 6a-b show block diagram illustrating an example of a method and a system for inverse tone mapping of an image based on multiple luminance zones according to various embodiments.

FIG. 6a is a flowchart of a method of inverse tone mapping of an image based on luminance zones according to various embodiments. A digital image can be obtained (101), for example, from a input device, such as a data storage device, e.g., a hard disk drive, computer memory (random access memory (RAM), read only memory (ROM), etc.), optical drive, etc., an image capture device, e.g., a digital camera, digital video camera, etc. Luminance values of pixels of the image can be determined (102). For example, if the image is encoded in a color opponent space, such as YUV, the luminance component (e.g., Y) can be used. If the image is encoded in a space that does not include a separate luminance component, the luminance values may be obtained through appropriate calculation based on the components of the color space.

One or more luminance zone boundaries can be determined (103). The luminance zone boundaries can divide the range of luminance into different zones, which can allow independent adjustments to luminance expansion in the different luminance zones. For example, in various embodiments, luminance can be divided into three zones, a low zone (e.g., a shadow zone), a middle zone (e.g., a midtone zone), and a high zone (e.g., a highlight zone).

The amount of luminance expansion in each of the three zones can be independently adjusted. In this way, for example, the expansion of the dynamic range of an image can be adjusted to account for how different luminance zones of the image respond to the expansion. In various embodiments, the luminance zone boundaries can be automatically selected based on an analysis of the image. In other various embodiments, the luminance zone boundaries can be user-selected.

A zone expansion exponent map can be determined (104) based on the luminance values and the one or more luminance zone boundaries. The zone expansion exponent map can include values that represent exponents to be applied to the luminance values of the image in an inverse tone mapping operation.

Noise in the luminance values can be reduced (107) by applying a method as described in relation with FIG. 1-5. A denoised luminance values $Y_{den}$ are then obtained.

The luminance values of the image can be inverse tone mapped (105) based on the zone expansion exponent map and the denoised luminance values $Y_{den}$, and an expanded dynamic range image can be provided (106) based on the inverse tone mapped luminance. In this way, for example, the dynamic range of the luminance of the inverse tone mapped image can be expanded, for example, to convert a low dynamic range image into a high dynamic range image. Because the zone expansion exponent map is based on selected luminance zone boundaries, the appearance of the expanded luminance within the zones of the tone mapped image can be individually adjusted.

FIG. 6b is a block diagram illustrating an example of a system 200 for inverse tone mapping of an image based on multiple luminance zones according to various embodiments.

System 200 can include one or more input devices 201 that can input data, such as an original LDR image 203, zone parameters 205, and a detail parameter (d) 207. One or more input devices 201 can include, for example, a data storage device, such as a hard disk drive, computer memory (RAM, ROM, etc.), optical drive, etc., an image capture device, such as a digital camera, digital video camera, etc., a user input device, such as a computer mouse and graphical user interface (GUI), a touch input device (such as a trackpad, touchscreen, etc.) and touch GUI, etc.

System 200 can also include a low-pass filterer 209, a zone expansion mapper 211, an inverse tone mapper 213, a detail enhancer 215, a saturation enhancer 217, a denoiser 500 and an HDR display device 219. Detail enhancer 215 can include a high frequency extractor 221 and a luminance enhancer 223.

The denoisier 500 is configured to implement a method described in relation with one of the FIG. 1-5. The luminance values Y(p) can be provided to the denoiser 500. The denoised luminance values $Y_{den}(p)$, output the denoiser 500 can be provided to the high frequency extractor 221 and to the inverse tone mapper 213.

A pre-processor 202 can obtain original LDR image 203 from one or more input devices 201, and luminance values (Y(p)) 225 can be provided to low-pass filterer 209.

Chrominance values (U(p) and V(p)) 227 can be provided to saturation enhancer 217. In various embodiments, original LDR image 203 can be in a color opponent space (e.g., YUV, XYZ, Yxy, CIE Lab), which includes luminance as an independent component. In this example, YUV is shown. In various embodiments, original LDR image 203 could be in a format that does not represent luminance as an independent component (e.g., RGB), in which case system 200 can determine luminance values 225 (and color values values 227) as one skilled in the art would readily understand. Moreover, original LDR image 203 can be processed in other ways, such as normalization, linearization, etc., such that the color and luminance of the obtain image are represented in the color space of a display device, for example. This color space can be standardized, and the corresponding display device can be a virtual one. Thus, in various ways, a luminance value Y(p) and two color values U(p), V(p) can be associated with the color of any pixel, p, of original LDR image 203.

Zone expansion mapper 211 can obtain zone expansion parameters 205 from one or more input devices 201 and can obtain a maximum display luminance ($L_{max}$) 229 from HDR display device 219. Although $L_{max}$ 229 is obtained directly from HDR display device 219 in this example, one skilled in the art would readily understand that in various embodiments $L_{max}$ could be obtained, for example, from one or more input devices 201.

Low-pass filterer 209 can determined a low-pass filtered version of luminance Y(p), referred to herein as a base luminance, $Y_{base}(p)$, shown as 231 in FIG. 6b.

The low-pass filtered version of luminance Y(p) can be provided the denoisier 500.

For example, low-pass filtering can be applied to luminance Y(p) of each pixel, p, of original LDR image 203 based on one or more Gaussian functions in a spatial neighborhood of the pixel p, and in a neighborhood of the luminance value Y(p). For example, $Y_{base}(p)$ can be determined through the following equation:

$$Y_{base}(p) = \Sigma_{i \in \Omega'} Y(p_i) f'_s(\|p_i - p\|) f'_r(\|Y(p_i) - Y(p)\|)$$

where $f'_s$ is first a Gaussian function applied on the spatial domain of the image, $f'_r$ a second Gaussian function applied on the luminance range domain, $\Omega'$ is the size of a window of the image centered at the pixel p, and $p_i$ is a pixel in this window.

In various embodiments, the window size can be for instance 5 or 7. Smaller values of window size may allow for better computational efficiency.

In this example, the low-pass filtering is bilateral, which refers to the fact that the filtering is performed here both in spatial and luminance range domains.

In various embodiments, the value of the standard deviation, $\sigma_S$, of the first Gaussian function $f'_s$ can be greater than or equal to 2. In various embodiments, the value of the standard deviation, $\sigma_r$, of the second Gaussian function $f'_r$ can be high enough to smooth texture and noise in the original LDR image, but low enough to avoid crossing edges between objects of the image. In various embodiments, the value of the standard deviation, $\sigma_r$, can be between 0.1 max(Y) and 0.5 max(Y), where max(Y) is the maximum luminance value over all pixels of the original image. In various embodiments, the standard deviation for the spatial Gaussian function $f'_s$ can be set at $\sigma_s = 3$, and the standard deviation for the luminance range Gaussian function $f'_r$ can be set at $\sigma_r = 0.3 \times \max(Y)$.

$Y_{base}(p)$ 231 can be provided to high frequency extractor 221 of detail enhancer 215, which is described in more detail below. $Y_{base}(p)$ 231 can also be provided to zone expansion mapper 211.

Zone expansion mapper 211 can determine a zone expansion exponent map, E'(p), 235 based on $Y_{base}(p)$ 231, zone parameters 205, and $L_{max}$ 229. Zone expansion exponent map, E'(p), 235 can be an image-sized floating point map, in which each value represents the exponent to be applied to the denoised luminance value $Y_{den}(p)$ of each pixel in original LDR image 203. In various embodiments, an expansion exponent map, E(p), can be determined first. The expansion exponent map can be based on a quadratic function, such as:

$$E(p) = a(Y_{base})^2 + bY_{base} + c$$

where the coefficients of the quadratic function, a, b, and c, can be parameters determined as follows based on the maximum display luminance, $L_{max}$:

$$a = p_{a1}\exp(p_{a2}L_{max}) + p_{a3}\exp(p_{a4}L_{max})$$

$$b = p_{b1}L_{max}^{p_{b2}} + p_{b3}$$

$$c = 1.3 \quad (5)$$

The parameters used in the above equations can be set, for example, as follows: $p_{a1} = -8.192e-7$, $p_{a2} = 0.000312$, $p_{a3} = 1.657e-5$, $p_{a4} = -0.0006967$, $p_{b1} = 0.05941$, $p_{b2} = 0.03135$, and $p_{b3} = -0.07579$.

In this way, for example, the shape of the expansion exponent map E(p) can change depending on the maximum display luminance, allowing for a global way of controlling the image appearance without requiring input from a user.

Then, the expansion exponent map, E(p), can be adjusted based on luminance zones. Zone expansion mapper 211 can adjust E(p) to obtain an zone expansion exponent map, E'(p). The zone expansion exponent map, E'(p), can be based on parameters that allow adjustment of the expansion exponent map, E(p), based on different zones of luminance.

In this way, for example, a user can be provided additional control over the expansion, which can, for example, allow a user to adjust the appearance of the resulting image and to better allow the user to convey (or preserve in the case of re-mastering) the director's intent. Independent adjusting of different luminance zones can, for example, allow better control of the luminance expansion in shadows and highlights.

In various embodiments, the minimum point of the curve of E(p) can be determined, and the value of E(p) at the minimum point, $Y_{base\_mid}$, can be obtained. The minimum point of E(p) can serve as a luminance zone boundary between two luminance zones of E(p).

On FIG. 1-6, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively << Application Specific Integrated Circuit >>, << Field-Programmable Gate Array >>, << Very Large Scale Integration >>, or from several integrated electronic components embedded in a device or from a blend of hardware and software components.

Figure 7:
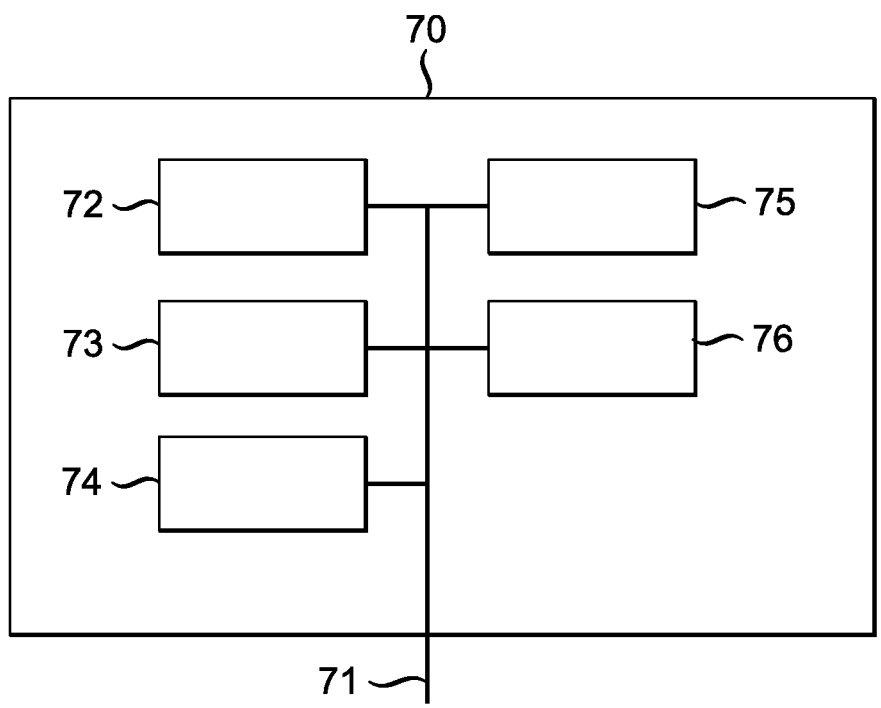
FIG. 7 shows an example of an architecture of a device in accordance with an example of present principles.

FIG. 7 represents an exemplary architecture of a device 70 which may be configured to implement a method described in relation with FIG. 1-6.

Device 70 comprises following elements that are linked together by a data and address bus 71:
- a microprocessor 72 (or CPU), which is, for example, a DSP (or Digital Signal Processor);
- a ROM (or Read Only Memory) 73;
- a RAM (or Random Access Memory) 74;
- an I/O interface 75 for reception of data to transmit, from an application; and
- a battery 76.

In accordance with an example, the battery 76 is external to the device. In each of mentioned memory, the word << register >> used in the specification can correspond to area of small capacity (some bits) or to very large area (e.g. a whole program or large amount of received or decoded data). The ROM 73 comprises at least a program and parameters. The ROM 73 may store algorithms and instructions to perform techniques in accordance with present principles. When switched on, the CPU 72 uploads the program in the RAM and executes the corresponding instructions.

RAM 74 comprises, in a register, the program executed by the CPU 72 and uploaded after switch on of the device 70, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of noise reducing or noise reducer, the input component C of the picture is obtained from a source. For example, the source belongs to a set comprising:

- a local memory (73 or 74), e.g. a video memory or a RAM (or Random Access Memory), a flash memory, a ROM (or Read Only Memory), a hard disk;
- a storage interface (75), e.g. an interface with a mass storage, a RAM, a flash memory, a ROM, an optical disc or a magnetic support;
- a communication interface (75), e.g. a wireline interface (for example a bus interface, a wide area network interface, a local area network interface) or a wireless interface (such as a IEEE 802.11 interface or a Bluetooth® interface);
- an picture capturing circuit (e.g. a sensor such as, for example, a CCD (or Charge-Coupled Device) or CMOS (or Complementary Metal-Oxide-Semiconductor)); and
- a display.

In accordance with examples, device 70 being configured to implement a method described in relation with FIG. 1-6, belongs to a set comprising:

- a mobile device;
- a communication device;
- a game device;
- a tablet (or tablet computer);
- a laptop;
- a still picture camera;
- a video camera;
- an encoding/decoding chip;
- a still picture server; and
- a video server (e.g. a broadcast server, a video-on-demand server or a web server);
- a display;
- a TV set;
- &a set top box;

Implementations of the various processes and features described herein may be embodied in a variety of different equipment or applications. Examples of such equipment include a denoiser, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for reducing noise in a component of a picture, characterized in that the method comprises:
    obtaining a low-pass filtered component by low-pass filtering said component of the picture;
    for a current pixel in said component of the picture:
        for at least one current neighboring pixel of the current pixel, computing a distance, relative to the current neighboring pixel, between the value of the current pixel in the low-pass filtered component and the value of the current neighboring pixel in the low-pass filtered component;

when the distances relative to said at least one neighboring pixels of the current pixel are lower than a first threshold, modifying the value of the current pixel in said component of the picture according to a linear combination of the value of the current pixel in said component of the picture and the value of the current pixel in the low-pass filtered component, otherwise the value of the current pixel in said at least one component of the picture remains unchanged;

computing a distance, relative to the current pixel, between the value of the current pixel in said component of the picture and the value of the current pixel in the low-pass filtered component; and when said distance, relative to the current pixel, is higher than a third threshold:
  checking if said distances are lower than the first threshold; and
  when said distances are lower than the first threshold, modifying the value of the current pixel in said component of the picture according to said linear combination, otherwise the value of the current pixel in said at least one component of the picture remains unchanged.

2. The method of claim 1, wherein the modifying of the value of the current pixel in said component of the picture comprises:
  replacing the value of the current pixel in said component of the picture by said linear combination.

3. The method of claim 1, wherein the modifying of the value of the current pixel in said component of the picture comprises:
  if at least one of the distance relative to a neighboring pixel is greater than a second threshold, said second threshold being lower than said first threshold, replacing the value of the current pixel in said component of the picture by said linear combination weighted by a coefficient that depends on both the value of the current pixel in said component, the value of the current pixel in the low-pass filtered component and the first and second thresholds;
  otherwise replacing the value of the current pixel in said component of the picture by said linear combination.

4. The method of claim 1, wherein said linear combination is defined by the value of the current pixel in said component of the picture and a difference between the value of the current pixel in said component of the picture and the value of the current pixel in the low-pass filtered component.

5. The method of claim 4, wherein said linear combination is defined by a difference between the value of the current pixel in said component of the picture and a product of the difference between the value of the current pixel in said component of the picture and the value of the current pixel in the low-pass filtered component by an attenuation function of the value of the current pixel in said component of the picture.

6. The method of claim 5, wherein said attenuation function of the value of the current pixel in said component of the picture is a piecewise-linear function.

7. The method of claim 5, wherein the values of said attenuation function are obtained from a look-up table.

8. A device for reducing noise in a component of a picture, characterized in that the device comprises a processor configured to:
  obtain a low-pass filtered component by low-pass filtering said component of the picture;
  for a current pixel in said component of the picture:
    for at least one current neighboring pixel of the current pixel, compute a distance, relative to the current neighboring pixel, between the value of the current pixel in the low-pass filtered component and the value of the current neighboring pixel in the low-pass filtered component;
    when the distances relative to said at least one neighboring pixels of the current pixel are lower than a first threshold, modify the value of the current pixel in said component of the picture according to a linear combination of the value of the current pixel in said component of the picture and the value of the current pixel in the low-pass filtered component, otherwise the value of the current pixel in said at least one component of the picture remains unchanged;
    computing a distance, relative to the current pixel, between the value of the current pixel in said component of the picture and the value of the current pixel in the low-pass filtered component; and
    when said distance, relative to the current pixel, is higher than a third threshold:
      checking if said distances are lower than the first threshold; and
      when said distances are lower than the first threshold, modifying the value of the current pixel in said component of the picture according to said linear combination, otherwise the value of the current pixel in said at least one component of the picture remains unchanged.

9. A non-transitory storage medium having stored therein instructions for causing a processor to perform at least the steps of the encoding method according to claim 1.

10. A non-transitory storage medium having stored therein instructions for causing a processor to perform at least the steps of the encoding method according to claim 7.

* * * * *